US008771057B2

(12) United States Patent
Miller et al.

(10) Patent No.: US 8,771,057 B2
(45) Date of Patent: Jul. 8, 2014

(54) SYSTEM AND METHOD FOR PROVIDING A LIST OF MONETARY INSTRUMENTS ASSOCIATED WITH A SYSTEM

(75) Inventors: Charles Wayne Miller, Henderson, NV (US); Michael D. Crittenden, Henderson, NV (US); David Smiley, North Las Vegas, NV (US); Thomas E. Soukup, Las Vegas, NV (US); Edward Sepich, Henderson, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 1488 days.

(21) Appl. No.: 11/561,074

(22) Filed: Nov. 17, 2006

(65) Prior Publication Data

US 2007/0111793 A1 May 17, 2007

Related U.S. Application Data

(60) Provisional application No. 60/737,540, filed on Nov. 17, 2005.

(51) Int. Cl.
*A63F 13/00* (2014.01)

(52) U.S. Cl.
USPC ................................................ 463/25; 463/29

(58) Field of Classification Search
USPC ................................................ 463/25, 29, 43
See application file for complete search history.

(56) References Cited

U.S. PATENT DOCUMENTS 5,470,079 A * 11/1995 LeStrange et al. .............. 463/25
5,897,625 A 4/1999 Gustin et al.
6,536,662 B1 3/2003 Ohno
6,558,255 B2 5/2003 Walker et al.
6,758,393 B1 7/2004 Luciano et al.
6,848,614 B2 2/2005 Hatanaka et al.
2001/0014881 A1 8/2001 Drummond et al.
2002/0034299 A1 * 3/2002 Charrin ......................... 380/251
2002/0082994 A1 6/2002 Herziger
2002/0147598 A1 10/2002 Smith et al.
2003/0087692 A1 * 5/2003 Weiss .............................. 463/25
2004/0002386 A1 1/2004 Wolfe et al.
2004/0087360 A1 5/2004 Chamberlain et al.
2004/0106449 A1 6/2004 Walker et al.
2004/0133485 A1 7/2004 Schoonmaker et al.

(Continued)

FOREIGN PATENT DOCUMENTS

WO 02/058020 A2 7/2002
WO 02/058020 A3 7/2002

*Primary Examiner* — Arthur O Hall
*Assistant Examiner* — Allen Chan
(74) *Attorney, Agent, or Firm* — Howard & Howard Attorneys PLLC

(57) ABSTRACT

A system has one or more gaming devices including gaming machines and other devices. At least one transaction reading device is coupled to the gaming devices and reads information associated with the monetary instruments associated with the gaming devices. A host computer is operatively coupled to the transaction reading device. A database is associated with the host computer and is configured to retrievably store the information associated with monetary instruments. A data display device is operatively coupled to the host computer and retrieves and displays a list of the monetary instruments in response to input from a user. The data display device can be associated with a wireless remote device, wired to the host computer or associated with the gaming device. The list of the monetary instruments includes information associated with each of the monetary instruments. The list of the monetary instruments can include information from selected gaming devices.

57 Claims, 5 Drawing Sheets

(56) References Cited

U.S. PATENT DOCUMENTS

| | | | | |
|---|---|---|---|---|
| 2004/0180721 | A1* | 9/2004 | Rowe | 463/42 |
| 2004/0215566 | A1 | 10/2004 | Meurer | |
| 2004/0235562 | A1 | 11/2004 | Kiely et al. | |
| 2004/0266533 | A1 | 12/2004 | Gentles et al. | |
| 2005/0047642 | A1 | 3/2005 | Jones et al. | |
| 2005/0060231 | A1 | 3/2005 | Soukup et al. | |
| 2005/0090308 | A1 | 4/2005 | Weiss | |
| 2005/0107155 | A1* | 5/2005 | Potts et al. | 463/25 |
| 2005/0137017 | A1* | 6/2005 | Lechner et al. | 463/42 |
| 2005/0181864 | A1 | 8/2005 | Britt et al. | |
| 2005/0182678 | A1 | 8/2005 | Walker et al. | |

* cited by examiner

SYSTEM AND METHOD FOR PROVIDING A LIST OF MONETARY INSTRUMENTS ASSOCIATED WITH A SYSTEM

CROSS REFERENCE TO RELATED APPLICATION

This application claims the benefit of Provisional Application Ser. No. 60/737,540 filed Nov. 17, 2005, the entire specification of which is expressly incorporated by reference.

FIELD OF THE INVENTION

The present invention relates generally to gaming devices, and more particularly, to a system and method for providing a list of the monetary instruments associated with gaming devices.

BACKGROUND OF THE INVENTION

The growth and competition in the casino gaming market in recent years and the increasingly sophisticated and complex technology being integrated into the gaming environment, at the individual game, casino management, and auditing levels, presents both challenges and opportunities to game manufacturers, gaming establishment operators, and regulatory agencies. The technological capabilities and requirements of, for example, advanced electronic games, multi-site gaming operations, detailed player tracking, wide area progressive jackpots, and various alternatives to the use of currency and coins by players, all present a potentially huge pool of ever-changing data which can be of great value to casino operators, from a management standpoint, and to regulators from an auditing and compliance standpoint.

Casinos now have a wide range of gaming devices, including gaming machines such as slot machines, video slot machines, poker machines, video poker machines, arcade games, and video arcade games. There are also a wide variety of other devices associated with the business of the casino, virtual gaming machine, an electronic interface for use with table games, a vending machine, a token dispensing machine, a credit dispensing machine, or a ticket redemption machine, player tracking units, card readers, coin-bill management devices, ticket readers, display devices, and key pads.

Typically, the gaming machine controls various combinations of the associated devices to facilitate playing the games. For example, a player would generally input a monetary instrument, such as currency, or present a ticket or voucher into the gaming machine, indicate a wager, and initiate the game to be played. This process would require a transaction reading device such as coin-bill management devices and ticket readers, as well as for players to communicate instructions to the gaming device, for instance through a key pad or touchscreen display. After the playing of the game has been initiated by the player, the gaming machine determines a game outcome, presents the game outcome to the player, and may dispense an award of some type depending on the outcome of the game.

It is also important to encourage players to maintain interest in playing the games. A common approach is to offer incentives such as through player tracking or loyalty programs. These programs reward players based on a number of criteria, for example, the frequency of playing the games. In order to track the player, a player is identified during play by a player tracking identification card and/or a player identification number ("PIN"). The player tracking system tracks the player's play and awards player tracking points according to established criteria. The player tracking points may be redeemed for prizes, such as complimentary meals or merchandise.

As was briefly discussed, players may enter or access funds to play the gaming machine in various ways. For example, a player may add money to a gaming device by inputting currency, such as a bill, into the coin-bill management device, and the authenticity of the bill is determined. The value of the authenticated bill is converted into the credits for play on the gaming machine, which are then added to the gaming machine's credit meter.

Alternately, and in addition, the player may utilize a ticket or a voucher. The ticket or voucher may have an associated number of credits or a monetary amount. The ticket or voucher may be read by a reader. For example, the coin-bill management device may also be adapted to read tickets. If the ticket has an associated monetary amount, the monetary amount is converted into credits, which are then added to the gaming machine's credit meter. If the ticket has an associated number of credits, the credits are directly added to the credit meter.

Typically, after the player has inserted the monetary instrument into the transaction reading device, it is read and stored in a secure cash box. As can be appreciated, the cash box can only be handled using strict security protocols, and opened in a secure location, generally some distance from the gaming device.

Issues can arise regarding the inputting monetary instruments. A common problem occurs when a player disagrees with the monetary amount or the number of credits that the gaming device credits him with. As often happens, this comes about when, having inserted currency and/or a ticket/voucher into a gaming machine, the player forgets the monetary amount or number of credits. When this occurs, the player may suggest that the transaction reading device "misread" the monetary instrument. Currently, in order to address and investigate such an issue, the player must stop playing, get the attention of a member of the casino staff, who in turn must make arrangements for the cash box to be removed and transported to a secure location where the contents of the cash box can be viewed to determine if the player is correct. This process is inherently time-consuming for the player and casino staff, requires that the gaming device be unavailable for a significant period of time, and raises issues of security.

A system for accessing information regarding monetary instruments which were deposited into and/or withdrawn from a gaming machine along with other information pertaining to the machine is disclosed at U.S. Patent Application Publication 2004/0002386 A1 to Wolfe, et al. (the "Wolfe '386 Patent Application"). The monetary instruments described in the Wolfe '386 Patent Application are restricted to bills and coins. The system displays a list of the quantity of monetary instruments contained within the machine, sorted by denomination. The display is viewable on either the gaming machine or on a remote device wirelessly linked to the gaming machine. The remote device is a handheld computer or a personal data assistant ("PDA"). Additionally, information pertaining to drops performed at the machine is viewable on the machine. The Wolfe '386 Patent Application restricts the monetary instruments included in the list, not including cashless tickets, vouchers, or magnetic cards. Further, the display does not include the date and time of the deposit or withdrawal of monetary instruments from the gaming machine, and thus makes it impossible to verify specific transactions related to the monetary instruments.

Accordingly, there exists an opportunity to improve the availability of transaction specific lists of monetary instruments and to include a wider range of types of monetary instruments listed. In addition, casino staff must have the ability to resolve issues related to specific transactions more efficiently.

The present invention is aimed at one or more of the problems identified above.

SUMMARY OF THE INVENTION AND ADVANTAGES

In a first aspect of the present invention, a system with a gaming device is provided. A transaction reading device is coupled to the gaming device and is configured to read information associated with monetary instruments. A host computer is operatively coupled to the transaction reading device and is configured to receive the information associated with the monetary instruments. A database is associated with the host computer and is configured to retrievably store the information associated with the monetary instruments. A data display device is operatively coupled to the host computer and is configured to retrieve and display a list of the monetary instruments read by the transaction reading device coupled to the gaming device in response to input from a user. The list of the monetary instruments includes the information associated with each of the monetary instruments.

In a second aspect of the present invention, a system with a plurality of gaming devices is provided. A plurality of transaction reading devices are coupled to each of the plurality of gaming devices and are configured to read information associated with monetary instruments associated with a corresponding gaming device. A host computer is operatively coupled to the plurality of transaction reading devices and is configured to receive the information associated with the monetary instruments. A database is associated with the host computer and is configured to retrievably store the information associated with the monetary instruments. A data display device is operatively coupled to the host computer and is configured to retrieve and display a list of the monetary instruments read by the plurality of transaction reading devices coupled to at least one of the plurality of gaming devices, in response to input from a user, and the list of the monetary instruments includes the information associated with each of the monetary instruments.

In a third aspect of the present invention, a method is provided. The method includes the steps of reading information associated with monetary instruments associated with a gaming device; storing the information associated with the monetary instruments in a database; retrieving the information associated with the monetary instruments from the database in response to input from a user; and displaying lists of the monetary instruments in response to the input from the user, the lists of the monetary instruments including the information associated with each of the monetary instruments.

In a fourth aspect of the present invention, a method is provided. The method includes the steps of reading information associated with monetary instruments associated with a plurality of gaming devices; storing the information associated with the monetary instruments in a database; retrieving the information associated with the monetary instruments from the database in response to input from a user; and displaying lists of the monetary instruments in response to the input from the user, the lists of the monetary instruments including the information associated with each of the monetary instruments.

The methods and systems allow casino staff to identify detailed information about specific transactions related to a range of monetary instruments including not only bills and coins, but also including cashless tickets and vouchers. The result is that when a player raises a question about whether or not the gaming device has properly read the monetary instrument, casino staff have the ability to access a list of the monetary instruments input into a specific gaming device, the list including detailed information about each transaction. This allows casino staff to provide a player with immediate feedback regarding whether or not a monetary instrument was misread. The result is an increase in casino staff efficiency, the player will not waste time, the gaming device is not unavailable for use for any significant period of time, and security risks are minimized.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
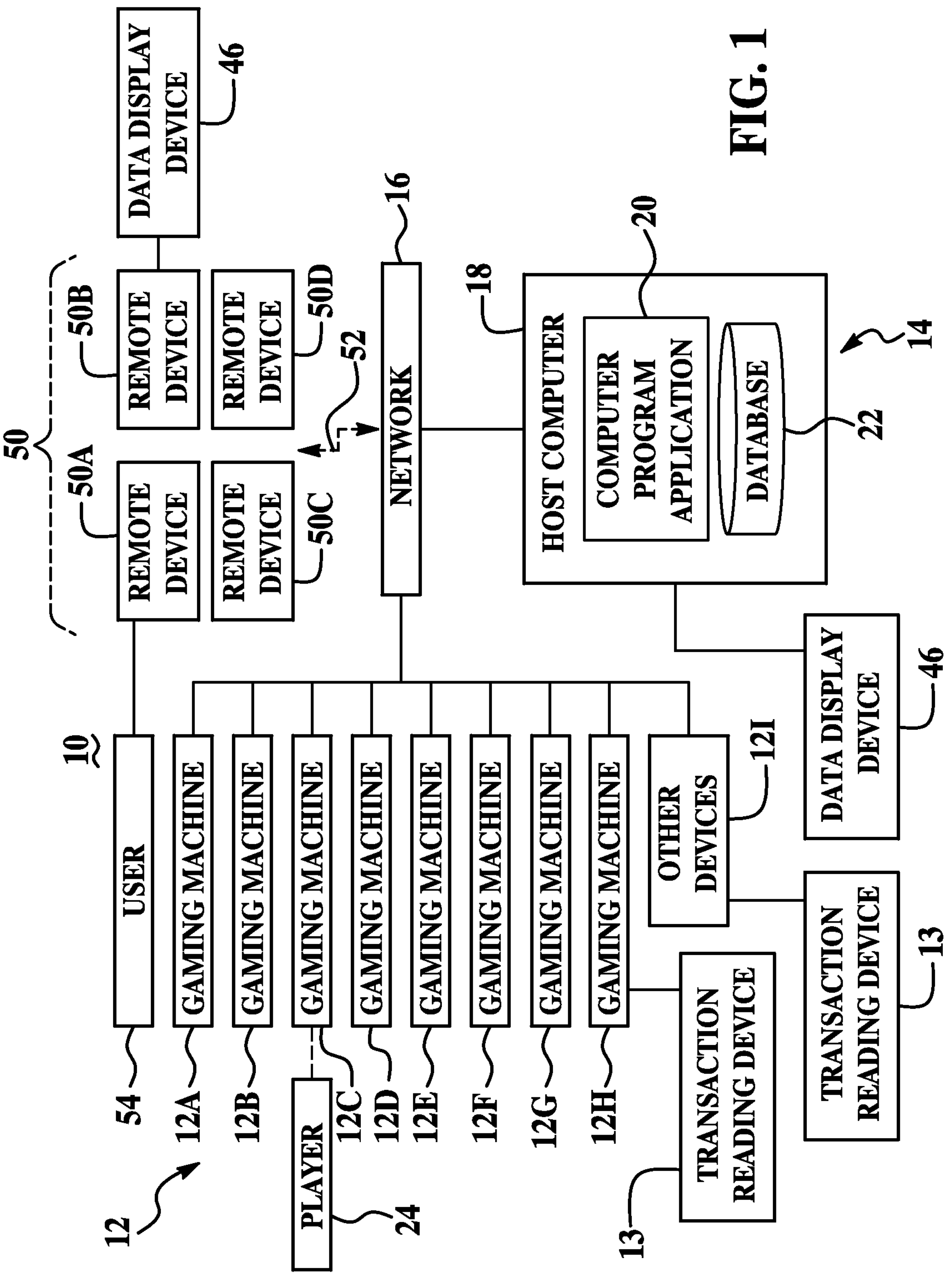
FIG. 1 is a block diagram of a system.
Figure 2:
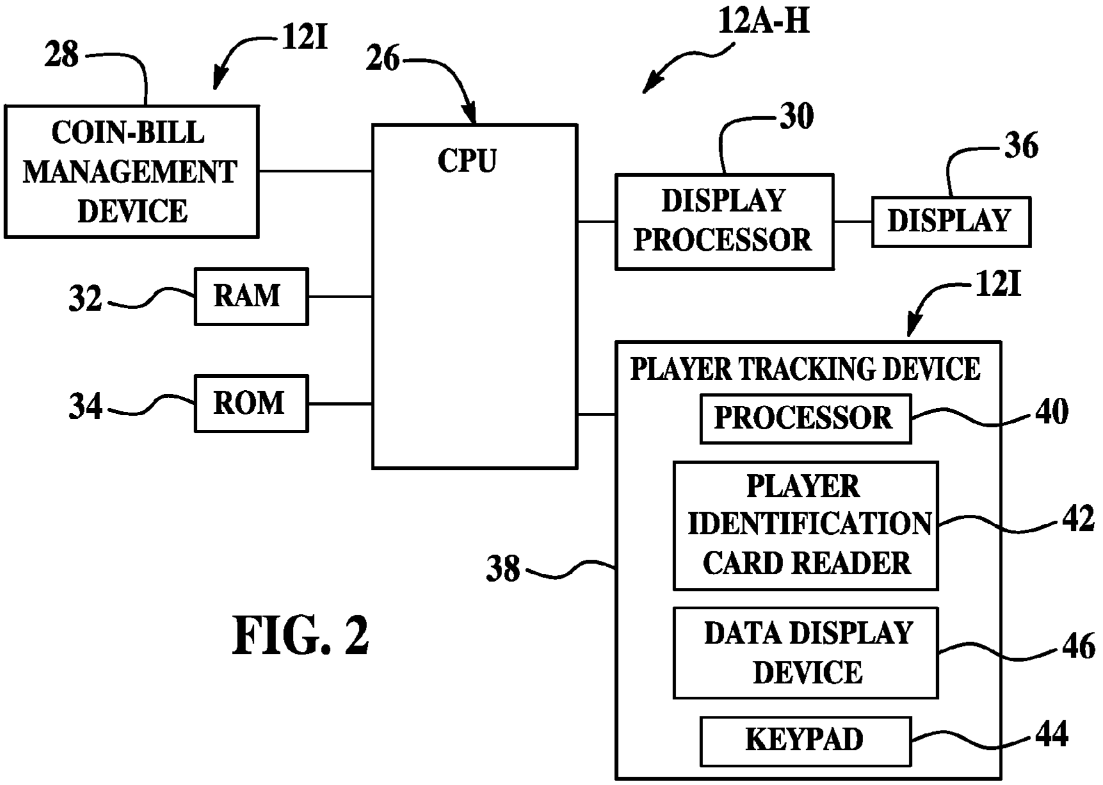
FIG. 2 is block diagram of a gaming machine and a player tracking device.

With reference to the drawings and in operation, a system is generally shown at 10 in FIGS. 1-2. The system 10 may include a range of functionality such as entertainment management and monitoring or gaming. For instance, the system 10 may support functionality such as real-time multi-site, slot accounting, player tracking, cage credit and vault, sports book data collection, Point of Sale ("POS") accounting, keno accounting, bingo accounting, and table game accounting, a wide area progressive jackpot, and electronic funds transfer ("EFT"). An exemplary system is disclosed in commonly assigned U.S. patent application Ser. No. 11/094,605 filed Mar. 30, 2005, the entire specification of which is expressly hereby incorporated by reference.

The present invention includes one or more gaming devices 12. The gaming devices 12 may be gaming machines 12A-H, such as slot machines, video slot machines, poker machines, video poker machines, arcade games, or video arcade games. In addition, the gaming devices 12 may also include other devices 12I, such as virtual gaming machines, electronic interfaces for use with table games, vending machines, token dispensing machines, credit dispensing machines, and ticket redemption machines. Although the example described above, and illustrated in FIG. 1, includes eight gaming machines 12A-H and one other device 12I, it can be readily appreciated that the present invention is not limited to any specific number of gaming devices 12. For instance, the system 10 may comprise a single gaming device 12, for example, one gaming machine 12A-H. It can be appreciated that where there are a plurality of gaming devices 12 there can be any combination or number of electric or electronic gaming machines 12A-H or other devices 12I. Similarly the gaming devices 12 can be organized into banks (not shown), each bank containing a plurality of gaming devices 12. Banks of machines may be further organized into zones (not shown).

The gaming devices 12 are playable by a player 24 who initiates play by inserting a monetary instrument (not shown) into the selected gaming machine 12A-H or other device 12I. The monetary instrument may be at least one of a plurality of types, including, but not limited to, currency (including bills or coins), tokens, cashless tickets, vouchers, magnet strip cards, player tracking cards, transfer of funds cards, input from a keypad, input from a touchscreen, and wired or wireless memory devices (not shown). In another aspect of the present invention, the monetary instrument may be a credit card, ATM card, debit card or the like. The player A transaction reading device 13 is coupled to at least one of the gaming devices 12. The transaction reading device 13 is configured to read information associated with the monetary instruments and/or the player inputs a transaction. An example of a common transaction reading device 13 is a coin-bill management device 28, and is illustrated in FIG. 2. The coin-bill management device 28 authenticates the currency, converts a monetary value of the currency into credits and adds the credits to a credit meter. Alternatively, a monetary value may be transferred to the gaming machine 12A-H using another of the plurality of types of monetary instruments, such as a ticket with a barcode, ticket with a magnetic strip, cashless voucher, or magnetic stripe card (not shown). The transaction reading device 13 may be configured to read more than one of the plurality of types of monetary instruments. In addition, the transaction reading device may be integral to another device, for example the coin-bill management device 28, or a separate device. If the player inputs a transaction (e.g., transfers funds from another account, such as a bank account or a credit card account), the transaction information is used.

Returning to FIG. 1, a host computer 18 is operatively coupled to the transaction reading device 13, and is configured to receive the information associated with the monetary instruments. The host computer 18 includes a computer program application 20 which maintains one or more databases 22. The computer program application can be any suitable application, for example, Oracle®. For small systems 10, the host computer 18 can be physically combined with the gaming device 12. For larger systems, the host computer 18 is generally located at a remote or central location. It can further be appreciated that there can be more than one host computer 18.

At least one database 22 is configured to retrievably store the information associated with the monetary instruments. The computer program application 20 and databases 22 may be used to record, track, and report accounting information regarding the gaming devices 12 and/or users of the other devices 12I or players 24 of the gaming machines 12A-H. Additionally, the computer program application 20 and databases 22 may be used to maintain information related to player tracking accounts, which will be discussed later.

A network 16 connects the gaming devices 12 to one or more host computers 18. It can be appreciated that the network 16 can be configured in any reasonable way, for instance using either wired or wireless technology.

A remote system 50 may also be included. The remote system 50 provides access to various features or functions of the system 10 by one or more remote devices 50A-D. The remote devices 50A-D are connected to the network 16 through a network link 52. Although four remote devices 50A-D are illustrated, it can be appreciated that any number of remote devices 50A-D may be included.

The remote devices 50A-D may be carried by authorized employees to allow them to offer or administer specific gaming services. Suitable remote devices are described in the following US patent documents which are hereby incorporated by reference:

US Patent Application Publication 2004/0113360 published Jun. 17, 2004 listing Jeffrey George et al as the inventors;

US Patent Application Publication 2004/0092303 published May 13, 2004 listing Jeffrey George et al as the inventors;

US Patent Application Publication 2004/0092314 published May 13, 2004 listing Jeffrey George et al as the inventors;

US Patent Application Publication 2004/0092306 published May 13, 2004 listing Jeffrey George et al as the inventors;

US Patent Application Publication 2004/0092305 published May 13, 2004 listing Jeffrey George et al as the inventors;

US Patent Application Publication 2004/0092304 published May 13, 2004 listing Jeffrey George et al as the inventors;

US Patent Application Publication 2004/0082386 published Apr. 29, 2004 listing Jeffrey George et al as the inventors;

US Patent Application Publication 2004/0116185 published Jun. 17, 2004 listing Jeffrey George et al as the inventors;

US Patent Application Publication 2004/0116184 published Jun. 17, 2004 listing Jeffrey George et al as the inventors;

US Patent Application Publication 2004/0127291 published Jul. 1, 2004 listing Jeffrey George et al as the inventors;

US Patent Application Publication 2004/0132531 published Jul. 8, 2004 listing Jeffrey George et al as the inventors;

US Patent Application Publication 2004-0092307 published May 13, 2004 listing Jeffrey George et al as the inventors;

US Patent Application Publication 2005/0027381 published Feb. 3, 2005 listing Jeffrey George et al as the inventors; and, US Patent Application Publication 2005/0075165 published Apr. 7, 2005 listing Jeffrey George et al as the inventors.

A data display device 46 is operatively coupled to the host computer 18. The data display device 46 may be a component of a handheld computer, a terminal, a player tracking device or the gaming device 12. The data display device 46 is configured to retrieve and display a list of the monetary instruments 92 read by the transaction reading device 13 in response to input from a user 54. Lists of information associated with the monetary instruments 92 can be displayed on one or more data display devices 46. For example, a data display device 46 associated with a remote device 50A-D can display a list of the monetary instruments 92 associated with one or more gaming devices 12 anywhere in the system 10. Similarly, a data display device 46 associated with a first gaming device 12, may display a list of the monetary instruments 92 associated with a second gaming device 12. Further, a data display device 12 directly wired to the host computer

18 can view a list of the monetary instruments 92 associated with any of the gaming devices 12.

Referring to FIG. 2, a block diagram of an exemplary electronic gaming machine 12A-H and other device 12I is shown. The gaming machine 12A-H includes a central processing unit ("CPU") 26 which functions as a game controller. The CPU 26 may include a microprocessor unit and performs various calculations and motion control necessary for the progress of the game. The transaction reading device 13, here illustrated as a coin-bill management device 28, reads information associated with the monetary instrument, and the coin-bill management device 28 detects the insertion of a coin or a bill and performs a necessary process for managing the monetary instrument. A display processor 30 interprets commands issued from the CPU 26 and displays desirable images on a display 36. A RAM 32 temporarily stores programs and data necessary for the progress of the game. A ROM 34 stores, in advance, programs and data for controlling basic operation of the gaming machine 12A-H, such as the booting operation, game code and graphics, and comprises, for example, an EPROM.

Input to the gaming machine 12A-H may be accomplished via mechanical switches or buttons (not shown) or via an interface (not shown). Such gaming machines 12A-H are well known in the art and are therefore not discussed further.

Referring again to FIG. 2, the other device 12I is illustrated as a player tracking device 38. The player tracking device 38 is coupled to the gaming machine 12A-H. The player tracking device 38 includes a processor 40, a player 24 identification card reader 62 and/or and a data display device 46. It can be appreciated that the data display device 46 can be a touch-screen panel (not shown) and the keypad 44 can be implemented thereon. Similarly, it can be appreciated that the player tracking device 38 can be combined with the gaming machine 12A-H to form a single physical unit.

The player 24 may be identified by the player tracking device 38 in several ways. A player 24 can insert player tracking card into the player identification card reader 62. Alternatively, the player 24 can enter a player identification number (PIN) on the keypad 44. The player tracking device 38 may also be used to communicate information between the host computer 18 and the corresponding gaming machine 12A-H. The player tracking device 38 may also be used to track bonus points, e.g., incentive points or credits, downloaded from the host computer 18.

Player tracking accounts may be used, generally, to provide bonuses to a player 24, in addition to the award designated by, in the case of a video slot or poker machine, the pay table associated with the specific gaming machine 12A-H. In one aspect of the present invention, the bonuses are awarded as bonus points. In another embodiment, the bonus points are incentive points. In yet another embodiment, the bonus points are credits. The bonuses may be awarded to the player 24 based on set of criteria, including, but not limited to the following: a) the player's 24 play on the machine; b) the player's 24 overall play; c) the player's 24 play during a predetermined period of time; and d) the player's 24 birthday or anniversary; or e) any other definable criteria. Additionally, bonuses may be awarded on a random basis, for example, to a randomly chosen player 24 or by randomly chosen game. Bonuses may also be awarded in a discretionary manner or based on other criteria, such as, purchases made at a gift shop or other affiliated location.

The incentive points may be converted to credits using a predetermined ratio or any other desired ratio. The predetermined ratio may also be varied based on determined criteria, for example, the identification of the gaming machine 12A-H being played, the player 24, or the time of day. Incentive points may be designated as cashable or non-cashable. The incentive points in a player's 24 account may be downloaded to any one of the gaming machines 12A-H for play.

Figure 3:
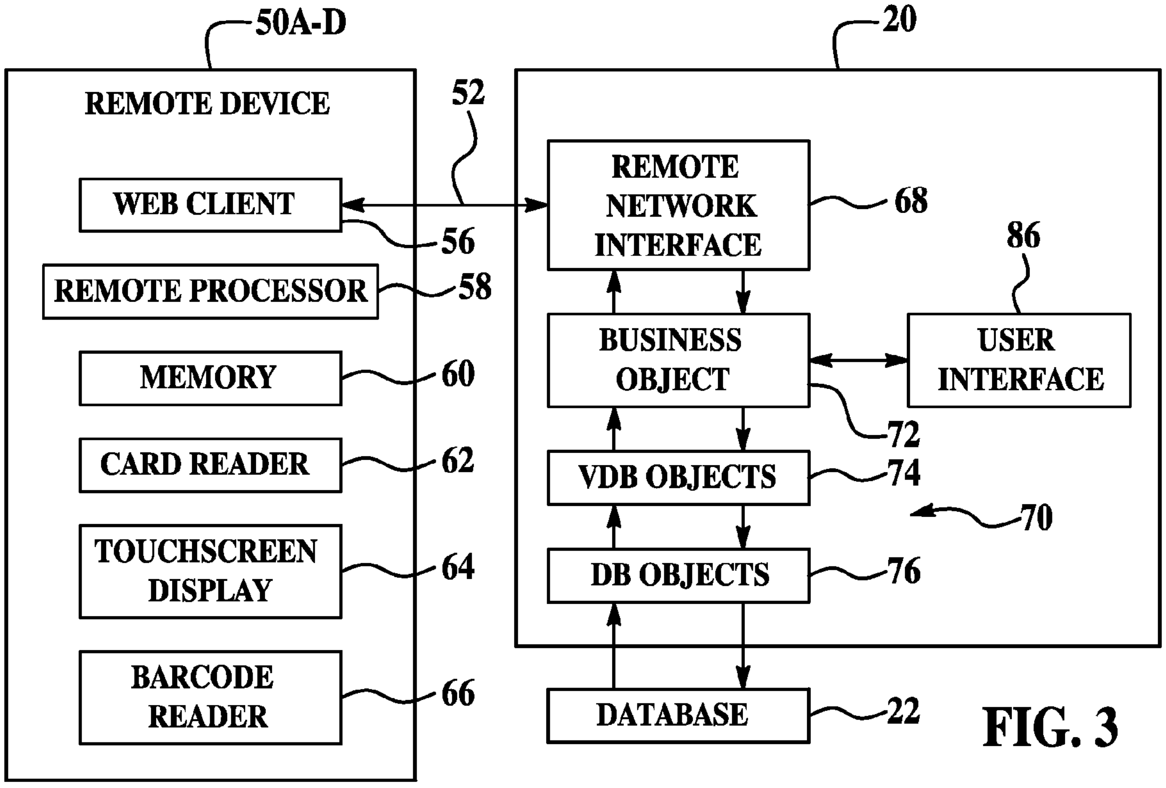
FIG. 3 is a block diagram of a remote device and the interface with a computer program application.

Referring to FIGS. 1 and 3, the remote system 50 is connected to the network 16 through a network link 52. One or more remote devices 50A-D are generally used by a user 54 and provide, as will be discussed below, access to various data and/or functions of the system 10. In one aspect of the present invention, the network link 52 is a wireless connection. In one embodiment, the wireless connection uses the IEEE standard, e.g., 11*b* or 11*g*. However, it should be noted that wireless links using other standards may also be used where appropriate, such as a short range radio link, in other words, a link using the technology known as "Blue Tooth". In another aspect of the present invention, the network link 52 may be a wire link.

In one aspect, the user 54 is an employee of the gaming establishment where the system 10 is operating. Typically, the user 54 has an assigned role, sometimes referred to as a type, based on their job description. Typical roles may include, but are not limited to, system administrator, supervisor, pit boss, pit manager, slot floor employee, patron host, player's club, security, security supervisor, slot attendant, slot director, slot shift supervisor, slot technician, sports and racebook, surveillance, and table supervisor.

In one embodiment of the present invention, the remote devices 50A-D provide access to one or more types of data and/or one or more functions based on the assigned role of the user 54. The remote device 50A-D may provide access to one or more of the following functions: remote patron signup, remote patron information, remote device information, remote cash ticket processing, remote jackpot ticket processing, remote hopper fill ticket processing, remote table rating interface, remote attendance, remote surveillance, adjusting a player's 24 bonus or comp points, issuing comp vouchers to a player 24, redeeming printed vouchers, listing and redeeming outstanding vouchers assigned to a player 24, and retrieving and displaying information related to a specific remote device 50A-D.

The remote device 50A-D includes a processor 40, a memory 60 for storing applications and data, and a touch-screen display 64. A bar code reader 66 may be used to read a player identification card number from the player identification card or to read a device identification number from a gaming device 12. One such mobile computer is available from Symbol Technologies, Inc. of Holtsville, N.Y. as model number SPT. Alternatively, the remote device 50A-D may include a card reader 62 capable of reading magnetic stripe identification cards. The remote device 50A-D may be a mobile computer based on the PALM® operating system 10 or Microsoft Windows® operating system 10. Alternatively, the remote device 50A-D may be desktop, laptop, notebook, and/or sub-notebook computers. It can be readily appreciated that the remote devices 50A-D are not limited to any particular technology or functionality.

The remote device 50A-D includes a web client 56 which is stored in the memory 60 and which runs on the remote processor 58. The web client 56 is connected to the computer program application 20 running on the host computer 18 through the network link 52.

In one aspect of the present invention, all interaction with the user 54, including the display of data and queries and the input of data, is handled by the web client 56. The web client 56 is responsible for acquiring user input, for example, through forms, and formatting and presenting information to the user 54. The web client 56 is a computer application which is accessed via a web browser, such as Microsoft Internet Explorer®, available from Microsoft Corp., of Redmond Calif. The web client 56 may be written in Hypertext Mark-Up Language ("HTML") and include one or more servlets, discussed, later, which may be written in a computer programming language, such as Java™.

As shown in FIG. 3, the computer program application 20 implements a remote network interface 68. The remote network interface 68 couples the web client 56 with the database 22. In one embodiment, the remote network interface 68 obtains data from the database 22, formats the data, for example, into an HTML response, and returns the formatted data to the web client 56.

The remote network interface 68 may be coupled to the database 22 by one or more data objects 70. In one embodiment, data is stored in the database 22 in data tables. The data objects 70 handle requests from the remote network interface 68, abstract the required data from the database 22 tables and/or input data into the database tables.

The data objects 70 include at least a first data object ("DB OBJECT") 76, at least one second data object ("VDBOBJECT") 74, and at least one third data object ("BUSINESS OBJECT") 72. The first data object is coupled to the database tables and abstract specific database tables for the at least one second data object 74. The first data object 76 handles retrieving and inputting data into specific database 22 tables. At least one second data object 74 is coupled to the first data object and assembles multiple first data objects 76 into a single third data object 72. At least one second data object 74 abstracts the third data object 72 from the database 22 tables. The third data object 72 is coupled to the at least one second data object 74. The third data object 72 receives queries from the remote network interface 68, retrieves responsive data from the database 22 through the first and second data objects 76, 74, formats the responsive data and returns the responsive data to the remote network interface 68.

Figure 4:
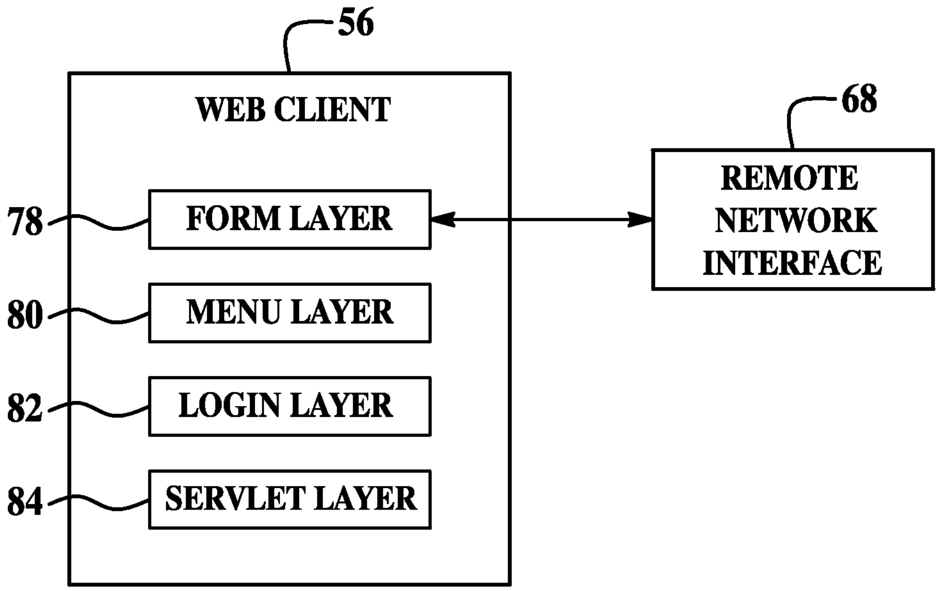
FIG. 4 is a block diagram of a web client operating on the remote device of FIG. 3.

Referring to FIG. 4, in one embodiment, the web client 56 is written in HTML. The web client 56 includes a form layer 78, a menu layer 80, a login layer 82, and a servlet layer 84. The login layer 82 provides security. It allows the user 54 to logon to the remote system 10. In one embodiment, the user 54 enters a name and password to logon. The user 54 may also be required to enter or select the site at which the user 54 is located.

The menu layer 80 allows the user 54, once logged on, to navigate to and between servlets. The servlets are downloaded to the remote device 50A-D from the host computer 18 as needed. The menu layer 80 also handles providing access to those servlets to which the user 54 has access, typically based on an assigned role, previously discussed. The form and servlet layers 84 provides common functionality for the servlets.

Referring back to FIGS. 1-4, as previously discussed, information associated with the lists of the monetary instruments 92 (including transactions input by the player) is displayed on the data display device 46 in response to input from the user 54. The information associated with the monetary instruments may include one or more of a date, a time, a monetary value, a type of the monetary instrument, a transaction type, or an identifier associated with the monetary instrument. The key is that the information is not summary information, it is transaction specific information. As a result, a user 45 can easily view the date and time a monetary instrument was input into one or more of the gaming devices 12. Further, the user can confirm a wide range of information about the type, monetary value, and identifier associated with the monetary instrument.

The list of the monetary instruments 92 may include a predetermined number of the monetary instruments, for example, the most recent twenty transactions may display as a default based on user input. A user may then have the ability to scroll beyond the initial display to view more transactions.

The information associated with each of the monetary instruments includes a number of values, such as date. A user 54 may input a range of values, to include monetary devices desiring the list of the monetary instruments including the monetary instruments whose value falls within, or outside of, the range of values. For example, if the user wanted the list of the monetary devices to include monetary devices input into the gaming devices for a particular week. Values may include a date, a time, a gaming device location, a gaming device zone, a type of the monetary instrument, a currency denomination, or a number of credits. Further, the list of the monetary instruments can be sorted by any of the values. For example, a list of the monetary instruments associated with a first and second gaming device 12 can be sorted by the identifier associated with each of the first and second gaming device 12.

As discussed above, the ability to view the list of the monetary instruments 92 may be provided in a variety of ways. A user 54 may view the list of the monetary instruments 92 using the player tracking device 38 and/or one of the remote devices 50A-D. Similarly, the list of the monetary instruments 92 may also be viewed at a remote workstation. Typically, only authorized users 54 will be able to view the list of the monetary instruments 92. The system may be configured to require the user 54 to log on or otherwise identify and verify their identity before viewing the list of the monetary transactions 92.

Lists of information associated with the monetary instruments 92 can include information from one or more gaming devices 12. A unique identifier may be associated with each of the plurality of gaming devices 12. The user 54 may select specific gaming devices 12 for which the list of the monetary instruments 92 will be displayed. The input from the user 54 can be in the form of a magnet strip card, entering a number from a keypad, selecting values from a menu, a barcode reader, a menu, or a wired or wireless memory device.

Figure 5:
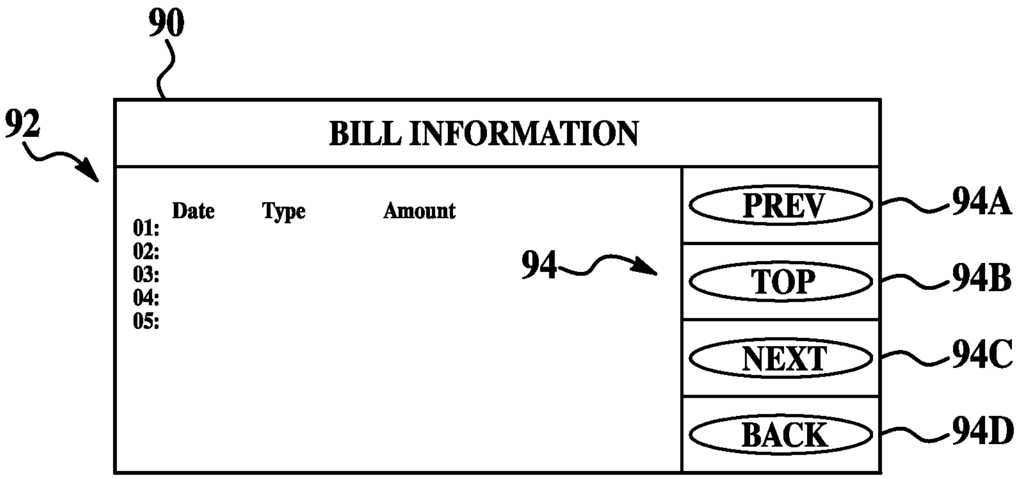
FIG. 5 is a diagrammatic illustration of a bill information screen for displaying a list of the most recent monetary instruments read by a transaction reading device associated with one or more gaming devices.

The superior report capabilities of the present invention are illustrated in FIGS. 5-8. A bill information display 90 is illustrated in FIG. 5. The bill information display 90 option could be presented to the user as one of the options provided by a game utilities menu (not shown) available on the player tracking device 38 and/or one of the remote devices 50A-D. The bill information display 90 includes a list of the most recent monetary instruments including any of the plurality of monetary instruments, for example, currency, tickets, vouchers, magnetic cards, inserted into and read by the transaction reading device 13 associated with the gaming machine 12A-H. The bill information display 90 may also be used to display the date and size of drops. Typically, only a predetermined number of entries will be displayed or all entries for a predetermined time period may be displayed. Other entries may be displayed by scrolling through the list of the monetary instruments 92 or advancing to a next page. Each entry will typically include information regarding the respective monetary instrument. For example, in the illustrated embodiment, the following are displayed for each entry: date, type (e.g., bill or ticket), and amount. More or less information may also be shown.

The bill information display 90 also provides a plurality of buttons 94, which may be implemented on the touchscreen display 64 of the player interface device or the user interface 86 of one of the remote devices 50A-D. In the illustrated embodiment, the plurality of buttons 94 include a previous button ("PREV") 94A, a top button ("TOP") 94B, a next button ("NEXT") 94C, and a back button ("BACK") 94D, which may be used to navigate through the bill information display 90A.

Figure 6:
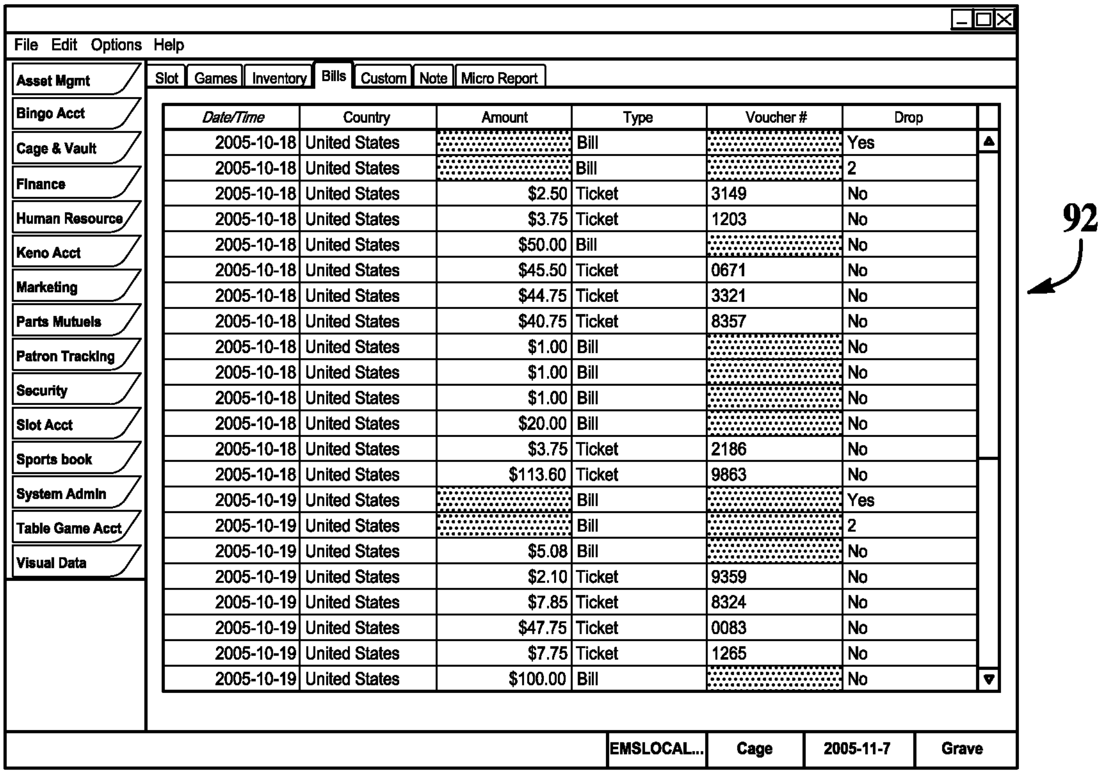
FIG. 6 is a diagrammatic illustration of a bill information screen for displaying a list of the monetary instruments associated with one or more gaming devices.
Figure 7:
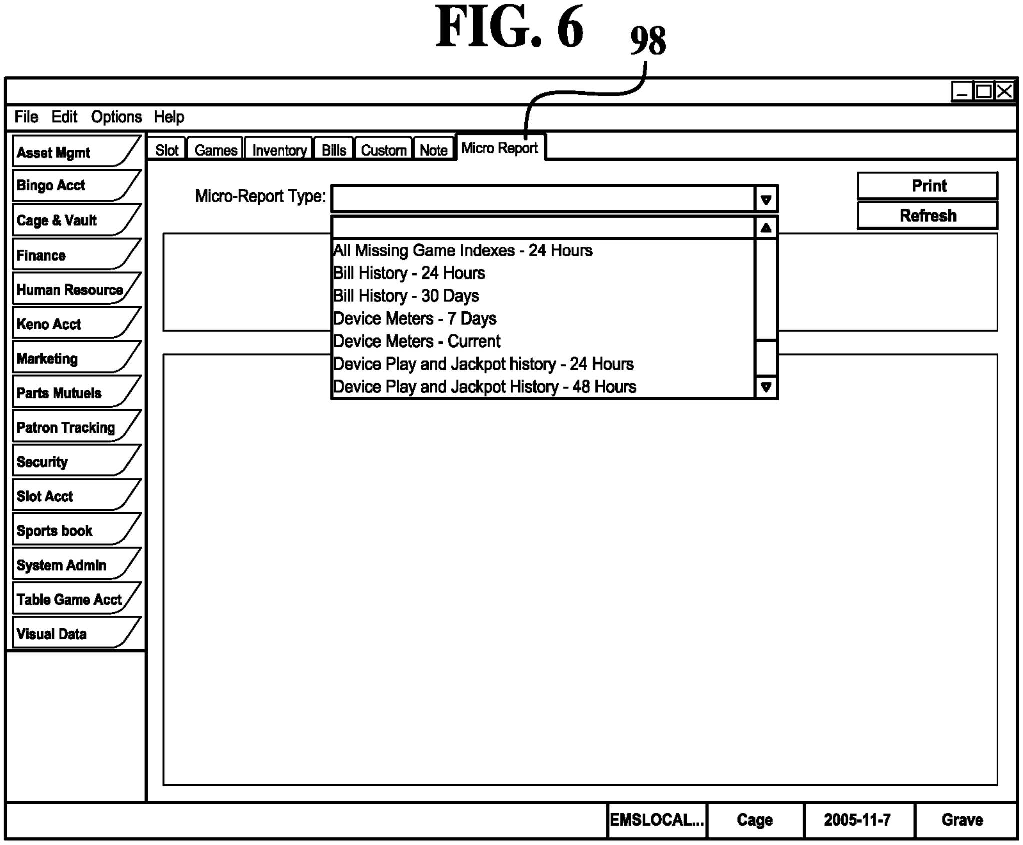
FIG. 7 is a diagrammatic illustration of a slot maintenance system displaying a list of available micro-reports, according to another embodiment of the system.
Figure 8:
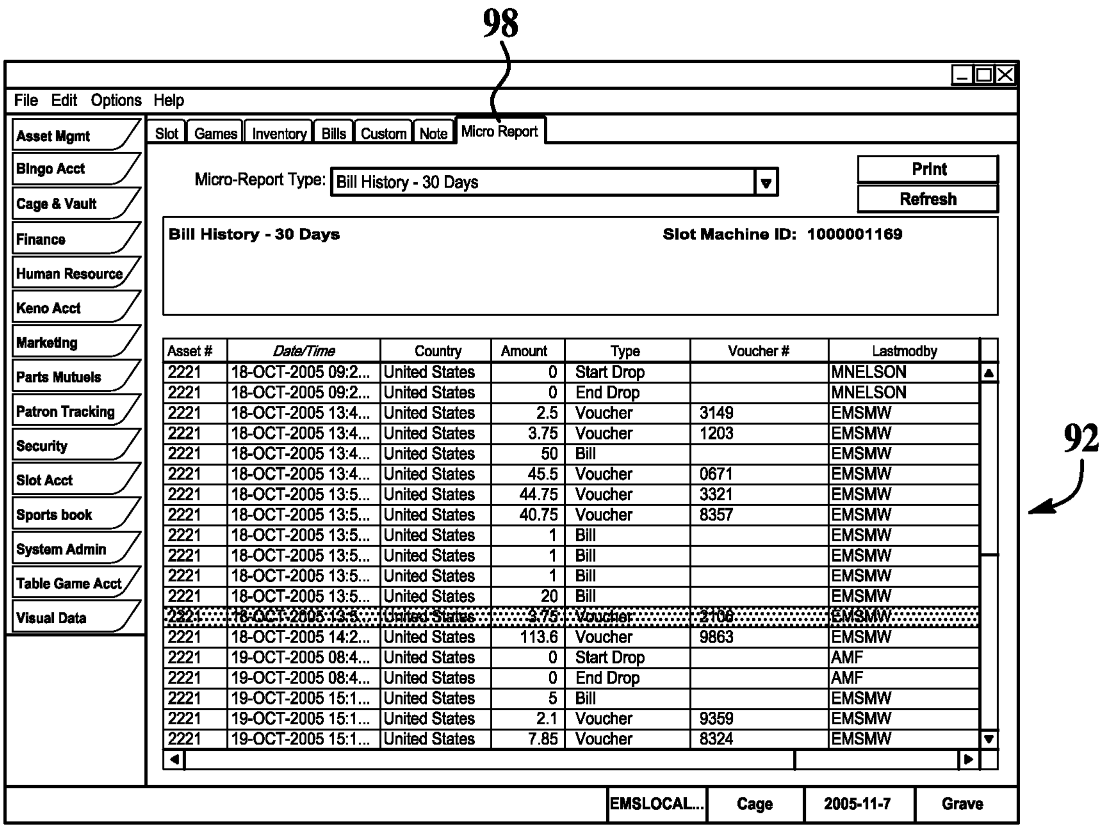
FIG. 8 is a diagrammatic illustration of a sample micro-report.

Referring to FIG. 6, a scrollable list of the monetary instruments 92 for a selected gaming machine 12A-H is shown. The date/time, country, amount, type, voucher number, and drop status are included in the list of the monetary instruments 92. A partial drop down list under the micro-report tab 98 is illustrated in FIG. 7. Additional reports can be included which are not illustrated here. Referring to FIG. 8, a Bill History—30 days report is illustrated. The asset number, Date/Time/Country, Amount, Type, voucher number, and last modified by information is included. It can be readily appreciated that additional information can be included in the list of the monetary instruments 92, and the order of the columns can be modified depending on the requirements of the particular implementation.

It should also be noted that any list of the monetary instruments 92 may also be exported for viewing and/or analysis within another computer program application 20.

The present invention also provides a method related to a system with a single gaming device, which having been largely discussed previously, will be summarized here. The method includes the step of reading information associated with monetary instruments associated with a gaming device. The information associated with the monetary instruments can be read by a transaction reading device 13 coupled to the gaming device 12. The gaming device 12 is generally one of a gaming machine 12A-H or other device 12I. The gaming machine 12A-H may be a slot machine, a video slot machine, a poker machine, a video poker machine, an arcade game, or a video arcade game. The other device 12I may be a virtual gaming machine 12A-H, an electronic interface for use with table games, a vending machine, a token dispensing machine, a credit dispensing machine, or a ticket redemption machine. The method includes the step of storing the information associated with the monetary instruments in a database. The database can be associated with a host computer 18. The method further includes the step of retrieving the information associated with the monetary instruments from the database in response to input from a user. The method further includes the step of displaying lists of the monetary instruments in response to the input from the user, the lists of the monetary instruments including the information associated with each of the monetary instruments.

The lists of the monetary instruments can be displayed on a data display device 46. The data display device 46 may be a component of a handheld computer, terminal, player tracking device or the gaming device 12. The information associated with the monetary instrument includes one or more of a date, a time, a monetary value, a type of the monetary instrument, a transaction type, or an identification associated with the monetary instrument. The information associated with the monetary instruments includes a date, a time, a monetary value, a type of the monetary instrument, a transaction type, and an identification associated with the monetary instruments. The list of the monetary instruments includes information associated with a predetermined number of the monetary instruments. The information associated with the monetary instruments includes values and the input from the user 54 includes a selection of the values, with the list of the monetary instruments including information associated with the selected values. A second gaming device 12 may be coupled to a second transaction reading device 13, with the data display device 46 being configured to display a list of the monetary instruments 92 read by one of the transaction reading devices 13 of at least one of the gaming devices 12. The gaming devices 12 may be coupled to a host computer 18 through a wired or wireless network 16.

The present invention also provides a method related to a system with a plurality of gaming devices, which having been largely discussed previously, will be summarized here. The method includes the step of reading information associated with monetary instruments associated with a plurality of gaming devices. The plurality of gaming devices 12 may be one of a gaming machine 12A-H and other device 12I. The gaming machine 12A-H may be a slot machine, a video slot machine, a poker machine, a video poker machine, an arcade game, and a video arcade game. The other device 12I may be a virtual gaming machine 12A-H, an electronic interface for use with table games, a vending machine, a token dispensing machine, a credit dispensing machine, and a ticket redemption machine. The information associated with the monetary instruments can be read by a plurality of transaction reading devices 13 coupled to each of the plurality of gaming devices 12 and being configured to read the information associated with the monetary instruments associated with a corresponding gaming device 12. The information can be associated with the monetary instruments in a database. The database 22 can be associated with a host computer 18 associated with the monetary instruments from the database in response to input from a user. The input can include a unique identifier associated with each of the plurality of gaming devices 12 wherein the input from the user 54 includes the unique identifier associated with selected gaming devices 12 to retrieve the information associated with the selected gaming devices 12, the input from the user 54 being by a magnet strip card, entering a number from a keypad 44, selecting values from a menu, a barcode reader 66, or a wired or wireless memory 60 device.

The lists of the monetary instruments can be displayed in response to the input from the user, the lists of the monetary instruments including the information associated with each of the monetary instruments. The lists of the monetary instruments are displayed on a plurality of data display devices 46. The plurality of data display devices 46 may be components of a handheld computer, a terminal, a player tracking device and the plurality of gaming devices 12. The information associated with the monetary instruments may include one or more of a date, a time, a monetary value, a type of the monetary instrument, an identification associated with the monetary instrument, and a transaction type. The information associated with the monetary instruments includes a date, a time, a monetary value, a type of the monetary instrument, an identification associated with the monetary instrument, and a transaction type. The lists of the monetary instruments include the information associated with a predetermined number of the monetary instruments. The information associated with the monetary instruments includes values and the input from the user 54 includes a selection of the values, with the list of the monetary instruments including the information associated with the selected values, in response to the input from the user 54. The values may include a date, a time, a gaming device zone, a type of the monetary instrument, a currency denomination, and a number of credits. The list of the monetary instruments may include the information associated with the monetary instruments associated with more than one of the plurality of gaming devices 12.

Obviously, many modifications and variations of the present invention are possible in light of the above teachings without departing from the essential scope thereof. Therefore, the invention is not intended to be limited to the particular embodiment disclosed, but that the invention will include all embodiments falling within the scope of the appended claims.

What is claimed is:

1. A system for use with a plurality of gaming devices, comprising:

a plurality of player tracking devices, each player tracking device being associated with one of the plurality of gaming devices and configured to enable a player to initiate player credit transactions to operate a corresponding gaming device;

a plurality of transaction reading devices, each transaction reading device being coupled to one of the plurality of gaming devices and being configured to receive monetary instruments and read information associated with the monetary instruments to enable a player to initiate a monetary instrument transaction to operate a corresponding gaming device, at least one monetary instrument including a currency bill;

a host computer operatively coupled to each transaction reading device and being configured to:

receive the information associated with the monetary instrument transactions and the player credit transactions;

assign a unique gaming device identifier indicative of the corresponding gaming device to the monetary instrument transactions and the player credit transactions;

generate a plurality of monetary instrument transaction records associated with each corresponding monetary instrument transaction, each monetary instrument transaction records being associated with a corresponding currency bill received during the corresponding monetary instrument transaction and including a monetary value of the corresponding currency bill, a date and a time the corresponding currency bill was received, and the assigned unique gaming device identifier; and generate a plurality of player credit transaction records, each of the plurality of player credit transaction records including transaction information associated with a corresponding player credit transaction and the assigned unique gaming device identifier;

a database associated with the host computer and being configured to retrievably store the generated transaction records, the host computer for awarding incentive points to player accounts stored in the database, each player tracking device allowing the player to initiate transactions to download incentive points from the host computer to the associated gaming device for play; and each player tracking device including a data display device operatively coupled to the host computer and being configured to retrieve and selectively display a list of transaction records in response to input from a user, the list of transaction records including the selected monetary instrument transaction records, the selected player credit transaction records, and the assigned unique gaming device identifier.

2. A system, as set forth in claim 1, wherein the monetary instruments may be at least one of a plurality of types, including currency, tokens, cashless tickets, vouchers, magnet strip cards, player tracking cards, transfer of funds cards, credit cards, ATM cards and the like, input from a keypad, input from a touchscreen, and wired or wireless memory devices.

3. A system, as set forth in claim 2, wherein the currency includes bills and coins.

4. A system, as set forth in claim 2, wherein the transaction reading device is configured to read more than one of the plurality of types of the monetary instruments.

5. A system, as set forth in claim 1, wherein the gaming device is one of a gaming machine or other device.

6. A system, as set forth in claim 5, wherein the gaming machine may be a slot machine, a video slot machine, a poker machine, a video poker machine, an arcade game, or a video arcade game.

7. A system, as set forth in claim 5, wherein the other device may be a virtual gaming machine, an electronic interface for use with table games, a vending machine, a token dispensing machine, a credit dispensing machine, or a ticket redemption machine.

8. A system, as set forth in claim 1, wherein each monetary instrument transaction record includes one or more of a type of the monetary instrument, a transaction type, or an identification associated with the monetary instrument.

9. A system, as set forth in claim 1, wherein each monetary instrument transaction record includes a type of the monetary instrument, a transaction type, and an identification associated with the monetary instruments.

10. A system, as set forth in claim 1, wherein the list of transaction records includes a predetermined number of the monetary instrument transaction records.

11. A system, for use with a plurality of gaming devices, comprising:

a plurality of player tracking devices, each player tracking device being associated with one of the plurality of gaming devices and configured to enable a player to initiate player credit transactions to operate a corresponding gaming device;

a plurality of transaction reading devices, each transaction reading device being coupled to one of the plurality of gaming devices and being configured to receive monetary instruments to enable a player to initiate a monetary instrument transaction to operate a corresponding gaming device; and a host computer operatively coupled to each of the transaction reading devices and each of the player tracking devices, the host computer configured to:

receive the information associated with the monetary instrument transactions and the player credit transactions;

assign a unique gaming device identifier indicative of the corresponding gaming device to the monetary instrument transactions and the player credit transactions;

generate a plurality of monetary instrument transaction records associated with each corresponding monetary instrument transaction, each monetary instrument transaction record being associated with a corresponding monetary instrument received during the corresponding monetary instrument transaction, each of the monetary instrument transaction records includes an input value and the assigned unique gaming device identifier; and generate a plurality of player credit transaction records, each of the plurality of player credit transaction records including transaction information associated with a corresponding player credit transaction and the assigned unique gaming device identifier;

each player tracking device including a data display device operatively coupled to the host computer and being configured to retrieve and selectively display a list of transaction records in response to input from a user, the list of transaction records including the selected monetary instrument transaction records, the selected player credit transaction records, and the assigned unique gaming device identifier, the input from the user including a range of input values, and the list of transaction records including the monetary instrument transaction records whose input value falls within the range of input values.

12. A system, as set forth in claim 11, wherein the input value may include a date, a time, a gaming device location, a gaming device zone, a type of the monetary instrument, a currency denomination, and a number of credits.

13. A system, as set forth in claim 1, including a second gaming device and a second transaction reading device, the data display device being coupled to the second transaction reading device and being configured to retrieve and display a second list of the monetary instruments read by the second transaction reading device coupled to the second gaming device.

14. A system, as set forth in claim 13, wherein the gaming devices are coupled to the host computer through a wired or wireless network.

15. A system, comprising:

a plurality of gaming devices;

a plurality of player tracking devices, each player tracking device being associated with one of the plurality of gaming devices and configured to enable a player to initiate player credit transactions to operate a corresponding gaming device;

a plurality of transaction reading devices coupled to each of the plurality of gaming devices and being configured to receive monetary instruments and read information associated with the monetary instruments to enable a player to initiate monetary instrument transactions to operate the corresponding gaming device, at least one monetary instrument including a currency bill;

a host computer operatively coupled to the plurality of transaction reading devices and being configured to:

receive the information associated with the monetary instrument transactions and the player credit transactions;

assign a unique gaming device identifier indicative of the corresponding gaming device to the monetary instrument transactions and the player credit transactions;

generate a plurality of monetary instrument transaction records associated with each corresponding monetary instrument transaction, each monetary instrument transaction records being associated with a corresponding currency bill received during the corresponding monetary instrument transaction and including a monetary value of the corresponding currency bill, a date and a time the corresponding currency bill was received, and the assigned unique gaming device identifier; and generate a plurality of player credit transaction records, each of the plurality of player credit transaction records including transaction information associated with a corresponding player credit transaction and the assigned unique gaming device identifier;

a database associated with the host computer and being configured to retrievably store the generated transaction records, the host computer for awarding incentive points to player accounts stored in the database, each player tracking device allowing the player to initiate transactions to download incentive points from the host computer to the associated gaming device for play; and each player tracking device including a data display device operatively coupled to the host computer and being configured to retrieve and display a list of transaction records in response to input from a user, the list of transaction records including the selected monetary instrument transaction records, the selected player credit transaction records, and the assigned unique gaming device identifier, the data display device being located at one of the plurality of gaming devices.

16. A system, as set forth in claim 15, wherein the monetary instruments may be at least one of a plurality of types, including currency, tokens, cashless tickets, vouchers, magnet strip cards, player tracking cards, transfer of funds cards, credit cards, ATM cards and the like, input from a keypad, input from a touchscreen, and wired or wireless memory devices.

17. A system, as set forth in claim 16, wherein currency includes bills and coins.

18. A system, as set forth in claim 16, wherein the transaction reading devices associated with the plurality of gaming devices are configured to read more than one of the plurality of types of the monetary instruments.

19. A system, as set forth in claim 15, wherein the plurality of gaming devices may include at least one of a gaming machine or other device.

20. A system, as set forth in claim 19, wherein the gaming machine may be a slot machine, a video slot machine, a poker machine, a video poker machine, an arcade game, or a video arcade game.

21. A system, as set forth in claim 19, wherein the other device may be a virtual gaming machine, an electronic interface for use with table games, a vending machine, a token dispensing machine, a credit dispensing machine, and a ticket redemption machine.

22. A system, as set forth in claim 15, wherein input from the user includes the unique gaming device identifier associated with a selected gaming device to retrieve the information associated with the selected gaming device, the input from the user being by magnet strip cards, entering a number from a keypad, selecting values from a menu, a barcode reader, a menu, or a wired or wireless memory device.

23. A system, as set forth in claim 15, wherein the monetary instrument transaction record includes one or more of a type of the monetary instrument, an identification associated with the monetary instrument, and a transaction type.

24. A system, as set forth in claim 15, wherein the monetary instrument transaction record includes a type of the monetary instrument, an identification associated with the monetary instrument, and a transaction type.

25. A system, as set forth in claim 15, wherein the list of transaction records includes a predetermined number of the monetary instrument transaction records.

26. A system, as set forth in claim 15, wherein each monetary instrument transaction record includes a value, the input from the user including a range of values, the list of transaction records including the monetary instruments whose value falls within the range of values.

27. A system, as set forth in claim 26, wherein the value may include a date, a time, a gaming device zone, a type of the monetary instrument, a currency denomination, and a number of credits.

28. A system, as set forth in claim 15, wherein the list of may include monetary instrument transaction records associated with more than one of the plurality of gaming devices.

29. A method, including the steps of:

reading, via a processor, information associated with monetary instrument transactions including monetary instruments associated with a gaming device, at least one monetary instrument including a currency bill;

assigning, by the processor, a unique gaming device identifier indicative of the gaming device to the information associated with the monetary instruments;

storing the information associated with the monetary instruments in a database;

storing incentive points in player accounts in the database;

allowing a player to initiate player credit transactions on the gaming device to download incentive points to the gaming device;

assigning the unique gaming device identifier to each of the player credit transactions;

generating a plurality of monetary instrument transaction records associated with each monetary instrument transaction, each monetary instrument transaction record being associated with a corresponding currency bill included in the corresponding monetary instrument transaction and including a monetary value of the corresponding currency bill, a date and a time the corresponding currency bill was received at the gaming device, and the assigned unique gaming device identifier;

generating a plurality of player credit transaction records, each of the plurality of player credit transaction records including information associated with the corresponding player credit transaction and the assigned unique gaming device identifier;

retrieving the transaction records from the database in response to input from a user;

providing a data display device coupled to the database and being located at the gaming device; and selectively displaying a list of transaction records on the data display device in response to the input from the user, the list including selected monetary instrument transaction records, selected player credit transaction records, and the unique gaming device identifier.

30. A method as set forth in claim 29, wherein the information associated with the monetary instruments is read by a transaction reading device coupled to the gaming device.

31. A method as set forth in claim 29, wherein the database is associated with a host computer.

32. A method, as set forth in claim 29, wherein the gaming device is one of a gaming machine or other device.

33. A method, as set forth in claim 32, wherein the gaming machine may be a slot machine, a video slot machine, a poker machine, a video poker machine, an arcade game, or a video arcade game.

34. A method, as set forth in claim 32, wherein the other device may be a virtual gaming machine, an electronic interface for use with table games, a vending machine, a token dispensing machine, a credit dispensing machine, or a ticket redemption machine.

35. A method as set forth in claim 29, wherein the list of transaction records are displayed on a data display device.

36. A method, as set forth in claim 35, wherein the data display device is provided as part of a player tracking device.

37. A method, as set forth in claim 29, wherein the monetary instrument transaction record includes one or more , a type of the monetary instrument, a transaction type, or an identification associated with the monetary instrument.

38. A method, as set forth in claim 29, wherein the monetary instrument transaction record includes a type of the monetary instrument, a transaction type, and an identification associated with the monetary instruments.

39. A method, as set forth in claim 29, wherein the list of transaction records includes a predetermined number of the monetary instrument transaction records.

40. A method, as set forth in claim 29, wherein the monetary instrument transaction record includes values and the input from the user includes a selection of the values, with the list of the monetary instruments including information associated with the selected values.

41. A method, as set forth in claim 29, including a second gaming device coupled to a second transaction reading device, with the data display device being configured to display a list of the monetary instruments read by one of the transaction reading devices of at least one of the gaming devices.

42. A method, as set forth in claim 29, wherein the gaming devices are coupled to a host computer through a wired or wireless network.

43. A method, including the steps of:

reading, via a processor, information associated with transactions including monetary instruments associated with a plurality of gaming devices, at least one monetary instrument including a currency bill;

assigning, by the process, a plurality of unique gaming device identifiers indicative of each gaming device of the plurality of gaming devices to the information associated with the monetary instruments to assign each monetary instrument to a corresponding gaming device;

storing the information and the unique gaming device identifier associated with the monetary instruments in a database;

storing incentive points in player accounts in the database;

allowing a player to initiate player credit transactions on the gaming devices to download incentive points to the gaming device;

assigning the unique gaming device identifier indicative of a corresponding gaming device to each of the player credit transactions;

generating a plurality of monetary instrument transaction records associated with each monetary instrument transaction, each monetary instrument transaction record being associated with a corresponding currency bill included in the corresponding monetary instrument transaction and including a monetary value of the corresponding currency bill, a date and a time the corresponding currency bill was received at the gaming device, and the assigned unique gaming device identifier;

generating a plurality of player credit transaction records, each of the plurality of player credit transaction records including a corresponding player credit transaction, and the assigned unique gaming device identifier;

storing the generated transaction records in the database;

retrieving the transaction records from the database in response to input from a user;

providing a data display device coupled to the database and being located at the gaming device; and selectively displaying a list of the transaction records on the data display device in response to the input from the user, the list of transaction records including the selected monetary instrument transaction records, the selected player credit transaction records, and the assigned unique gaming device identifier.

44. A method as set forth in claim 43, wherein the information associated with the monetary instruments is read by a plurality of transaction reading devices coupled to each of the plurality of gaming devices and being configured to read the information associated with the monetary instruments associated with a corresponding gaming device.

45. A method, as set forth in claim 43, wherein the database is associated with a host computer.

46. A method, as set forth in claim 43, wherein the plurality of gaming devices may be one of a gaming machine and other device.

47. A method, as set forth in claim 46, wherein the gaming machine may be a slot machine, a video slot machine, a poker machine, a video poker machine, an arcade game, and a video arcade game.

48. A method, as set forth in claim 46, wherein the other device may be a virtual gaming machine, an electronic interface for use with table games, a vending machine, a token dispensing machine, a credit dispensing machine, and a ticket redemption machine.

49. A method, as set forth in claim 43, wherein the input from the user includes the unique gaming device identifier associated with selected gaming devices to retrieve the information associated with the selected gaming devices, the input from the user being by a magnet strip card, entering a number from a keypad, selecting values from a menu, a barcode reader, or a wired or wireless memory device.

50. A method, as set forth in claim 43, wherein the lists of the transaction records are displayed on a plurality of data display devices.

51. A method, as set forth in claim 50, wherein the plurality of data display devices is a component of a player tracking device.

52. A method, as set forth in claim 43, wherein the monetary instrument transaction record includes one or more of a type of the monetary instrument, an identification associated with the monetary instrument, and a transaction type.

53. A method, as set forth in claim 43, wherein the monetary instrument transaction record includes a type of the monetary instrument, an identification associated with the monetary instrument, and a transaction type.

54. A method, as set forth in claim 43, wherein the lists of the transaction records include the information associated with a predetermined number of the monetary instruments.

55. A method, as set forth in claim 43, wherein each monetary instrument transaction record includes values and the input from the user includes a selection of the values, with the list of the monetary instruments including the information associated with the selected values, in response to the input from the user.

56. A method, as set forth in claim 55, wherein the values may include a date, a time, a gaming device zone, a type of the monetary instrument, a currency denomination, and a number of credits.

57. A method, as set forth in claim 43, wherein the list of transaction records may include the monetary instrument transaction records associated with more than one gaming device.

* * * * *

UNITED STATES PATENT AND TRADEMARK OFFICE

CERTIFICATE OF CORRECTION

PATENT NO. : 8,771,057 B2
APPLICATION NO. : 11/561074
DATED : July 8, 2014
INVENTOR(S) : Charles Wayne Miller et al.

It is certified that error appears in the above-identified patent and that said Letters Patent is hereby corrected as shown below:

In the Claims

Column 16, line 60, claim 28: insert after “list of”, -- transaction records --.

Column 18, line 20, claim 43: delete “process” and replace with -- processor --.

Column 20, line 9, claim 54: delete “lists” and replace with -- list --.

Signed and Sealed this
Ninth Day of December, 2014

Michelle K. Lee
*Deputy Director of the United States Patent and Trademark Office*